US012136069B2

(12) United States Patent
McConnell et al.

(10) Patent No.: US 12,136,069 B2
(45) Date of Patent: Nov. 5, 2024

(54) SYSTEMS, METHODS, AND DEVICES FOR GUIDED COMPONENT REPLACEMENT OF MOBILE SCANNING DEVICES

(71) Applicant: DATALOGIC USA, INC., Eugene, OR (US)

(72) Inventors: John Marvin McConnell, Eugene, OR (US); Eric Carey Freel, Eugene, OR (US)

(73) Assignee: DATALOGIC USA, Inc., Eugene, OR (US)

( * ) Notice: Subject to any disclaimer, the term of this patent is extended or adjusted under 35 U.S.C. 154(b) by 28 days.

(21) Appl. No.: 17/866,044

(22) Filed: Jul. 15, 2022

(65) Prior Publication Data

US 2024/0020653 A1   Jan. 18, 2024

(51) Int. Cl.
*G06Q 10/02* (2012.01)
*G06Q 10/20* (2023.01)

(52) U.S. Cl.
CPC .............. *G06Q 10/20* (2013.01); *G06Q 10/02* (2013.01)

(58) Field of Classification Search
CPC ....................................................... G06Q 10/02
See application file for complete search history.

(56) References Cited

PUBLICATIONS

Ravi, Nishkam, et al. "Context-aware battery management for mobile phones." 2008 Sixth Annual IEEE International Conference on Pervasive Computing and Communications (PerCom). IEEE, 2008. (Year: 2008).*

* cited by examiner

*Primary Examiner* — Emmett K. Walsh
(74) *Attorney, Agent, or Firm* — Shook, Hardy & Bacon L.L.P.

(57) ABSTRACT

Systems, devices, and methods for the guided exchange of a replacement component for a mobile scanning device are provided. The replacement component may be another mobile scanning device, battery, or in some aspects, an empty charging port. The replacement component may be engaged by a remote charging station that communicates the current charge state to the mobile scanning device. In some aspects, this communication may be facilitated by wireless communication (e.g., an advertising packet, a bi-directional data exchange, or a combination of both). Once identified, a path from the mobile scanning device to the replacement component may be provided to the user. As the mobile scanning device approaches the remote charging station corresponding to the replacement component a locking mechanism may be disengaged and indicators provided to assist a user's identification of the target replacement component.

20 Claims, 11 Drawing Sheets

SYSTEMS, METHODS, AND DEVICES FOR GUIDED COMPONENT REPLACEMENT OF MOBILE SCANNING DEVICES

CROSS-REFERENCE TO RELATED APPLICATIONS

None.

BACKGROUND

Barcodes and radio frequency identification (RFID) tags are present on many products to aid sales, inventory tracking, distribution logistics, and many other contexts. Generally, barcodes are optical machine-readable representations of data related to the product(s) to which it is attached. RFID tags are generally radio transponders that either actively or passively transmit data related to the product(s) to which it is attached. Normally, a scanner (also referred to herein as a "scanning device") reads (e.g., decodes) the barcode or RFID tag and a computer connected with the scanner receives the decoded data from the scanner and perform an action, which may vary based on situation. For example, in a sales context the computer may return a price of an identified product associated with the decoded data; in an inventory tracking context the computer may add a value to a running count corresponding to the product(s); or, in a distribution logistics context, the product(s) location may be identified or the product(s) may be routed to a location for sorting. Traditionally, mobile scanning devices (e.g., handheld scanners, mobile computers with scanning capabilities, wearable scanners, etc.) rely on a battery for power. These batteries lose charge over time while the mobile scanning device is being used. Once the charge capacity of the battery is depleted, the mobile scanning device loses power and may become temporarily inoperable.

SUMMARY

Embodiments of the disclosure relate to system and methods for the guided exchange of a mobile scanning device component. In some aspects, the component that is exchanged can be the battery of the mobile scanning device or the mobile scanning device itself. The guided exchange process may be initiated in response to the determination that the current battery charge of the mobile scanning device is below a charge threshold. In other words, when the battery charge of the mobile scanning device drops to a level at or below the charge threshold, the guided exchange process may be initiated as will be described more fully below.

In some embodiments, the charge threshold may be a fixed threshold value (e.g., 10% charge remaining) against which the current battery charge is compared. In some embodiments, the charge threshold may be a dynamic threshold that may vary based on certain situations. For example, the charge threshold may be based on the time of day, the current location of the mobile scanning device, or a rate of power consumption for the mobile scanning device. In other words, the charge threshold (e.g., 20% charge remaining) may be comparatively higher at the beginning of a user's shift or earlier in the day than at the end of a user's shift or later in the day. Similarly, the charge threshold may vary based on the mobile scanning device's proximity to a remote charging station or another defined location. In some embodiments, the guided exchange process may be initiated in response to an input by the user requesting the exchange. Additionally, in some embodiments, the guided exchange process may be remotely initiated. In other words, a remote device (e.g., an admin device) may communicate a signal to the mobile scanning device that initiates the guided exchange process In a first aspect, a system for the guided exchange of a mobile scanning device component is described including a mobile scanning device having a wireless communication transceiver, a processor, and non-transitory storage media. The processor and the non-transitory storage media may be physically located inside a housing of the barcode reader. The non-transitory storage media may store computer readable instructions that cause operations including establishing a wireless communication link with a remote charging station, determining the availability of one or more replacement components, reserving a replacement component, and providing a path from the mobile scanning device's current location to the replacement component.

In another aspect, a method for the guided exchange of a mobile scanning device component is described. The method may include detecting that a battery providing power to the mobile scanning device has a remaining charge equal to or below a charge threshold. The method may include the mobile scanning device detecting at least one wireless communication signal. The wireless communication signal may be broadcast by one or more remote charging stations. The wireless communication signal may be indicative of one or more available replacement batteries and/or replacement mobile scanning devices for exchange by the user. The method may further include, at the mobile scanning device, extracting a set of data from each of the at least one wireless communication signals detected during the scanning and, based on the extracted at least one set of data, determining which of the at least one wireless communication signal corresponds to an available replacement battery for the mobile scanning device. The method may further include, broadcasting a wireless communication signal including data requesting reservation of the replacement battery and mapping a path from a current location of the mobile scanning device to a location associated with the reserved replacement battery. The mapped path may be presented, via a display integrated with the mobile scanning device such as with the aid of a stored application on the mobile scanning device.

Another aspect non-transitory storage media is described that if executed by a group of processors cause a system to establish a wireless communication link with a remote charging station, determine the availability of one or more replacement components, reserve a replacement component, and providing a path from the mobile scanning device's current location to the replacement component.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is illustrated by way of example and not limitation in the accompanying figures in which like reference numerals indicate similar elements and in which.

DETAILED DESCRIPTION

Embodiments of the present disclosure involve detection of battery capacity and the guided replacement of a battery with a low capacity (e.g., a remaining capacity equal to, or less than, a predetermined charge threshold). The battery may be integrated with the mobile scanning device or removable from the mobile scanning device. The guided replacement of the battery may include detecting the remaining charge capacity of a battery of a mobile scanning device and computing whether the remaining capacity is below a defined charge threshold. Where the capacity is equal to and/or below the defined charge threshold, the guided replacement may facilitate the identification and selection of a replacement component. For example, the guided replacement may scan wireless communications signals (e.g., Bluetooth, Zigbee, 802.11 XX) for data regarding potential replacement batteries, mobile scanning devices, or both. The wireless communications signals may be broadcast by charging stations, other mobile scanning devices, and/or nodes of a networked server system. Once a suitable replacement component is identified (e.g., a battery compatible with the mobile scanning device), the replacement component may be reserved and allocated to the user's mobile scanning device. In some aspects, the allocated replacement component may be removed from the list of potential replacement components available to other mobile scanning devices. Thus, at least partially, ensuring that the exchange may occur without interference from other users. In some aspects, the reservation may be facilitated by establishing a bi-directional communication link with the remote charging station corresponding with the replacement component.

Figure 1:
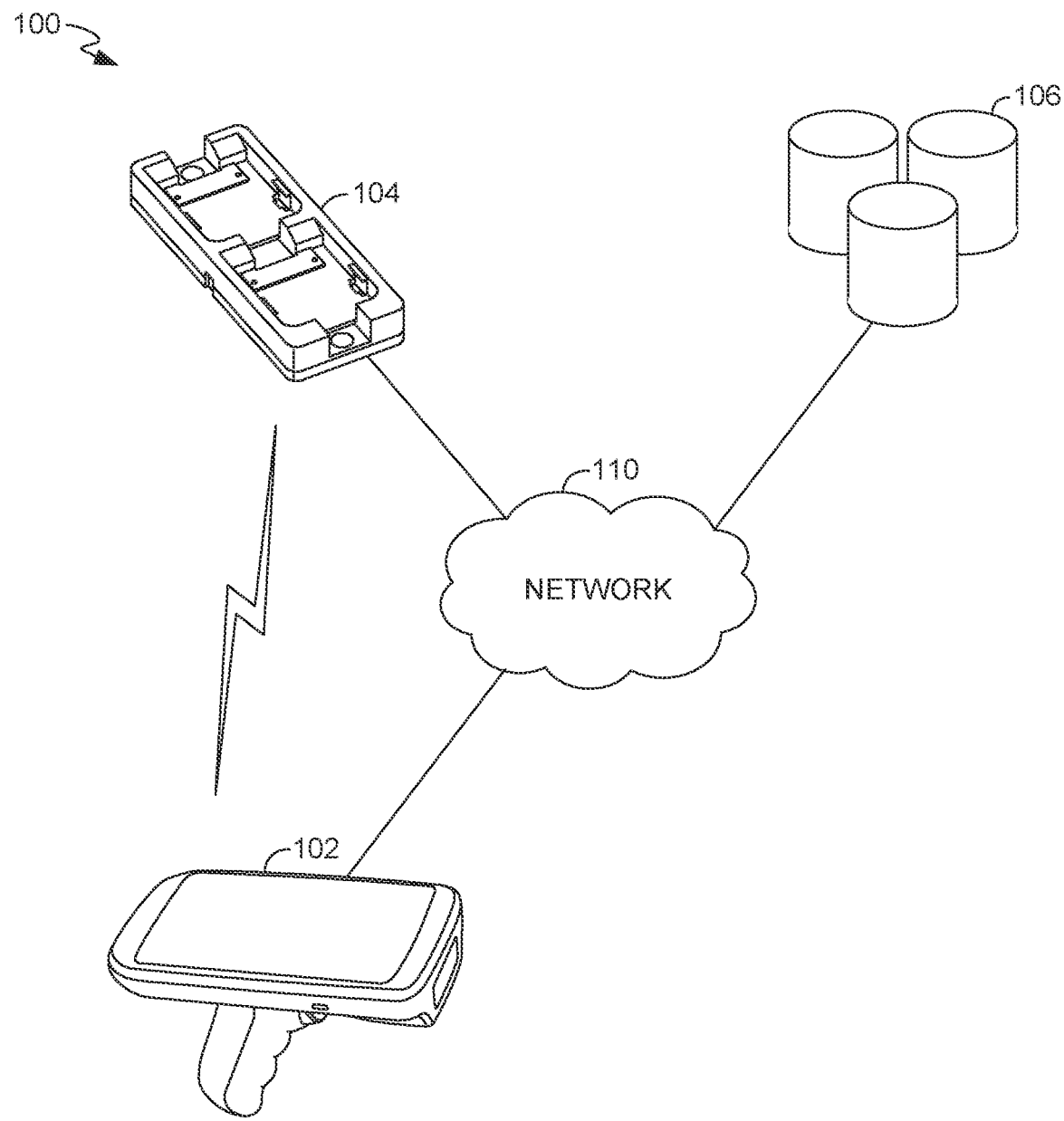
FIG. 1 is an example system environment including a mobile scanning device, and a charging station, in accordance with an embodiment of the present disclosure.

Turning to FIG. 1, an example system environment 100 is depicted for remote barcode decoding, in accordance with some aspects described herein. It should be understood that this and other arrangements described herein are set forth only as examples. Exemplary environments may include areas with hard to reach locations (e.g., where items are stored on a shelf) such as warehouses, retail locations, etc. Other environments may include areas where it may be desirable for limited access by users or mobile devices, such as sterile rooms or clean rooms in hospitals, laboratories, or other similar environments. At a high level, system environment 100 may facilitate the acquisition of one or more images containing a barcode using one or more remote sensors (e.g., remote sensor 104). The images may be communicated through a network (e.g., network 110) and decoded by a mobile computing scanner device (e.g., mobile scanner device 102). The mobile scanning device 102 may be a mobile computer with scanning capabilities as depicted, examples of which include the Skorpio, Memor, Joya, and Falcon product lines available from Datalogic S.p.A. of Bologna, Italy. The mobile scanning device 102 may also be a handheld scanner device, examples of which include the PowerScan, Quickscan, Gryphon product lines and other such handheld devices available from Datalogic S.p.A. of Bologna, Italy. Wearable scanner devices (e.g., gloves, glasses, etc.) are also contemplated in embodiments of the disclosure as well as any mobile scanning device that is battery operated where replacement of the battery or the device itself may be needed after a period of time.

Figure 2:
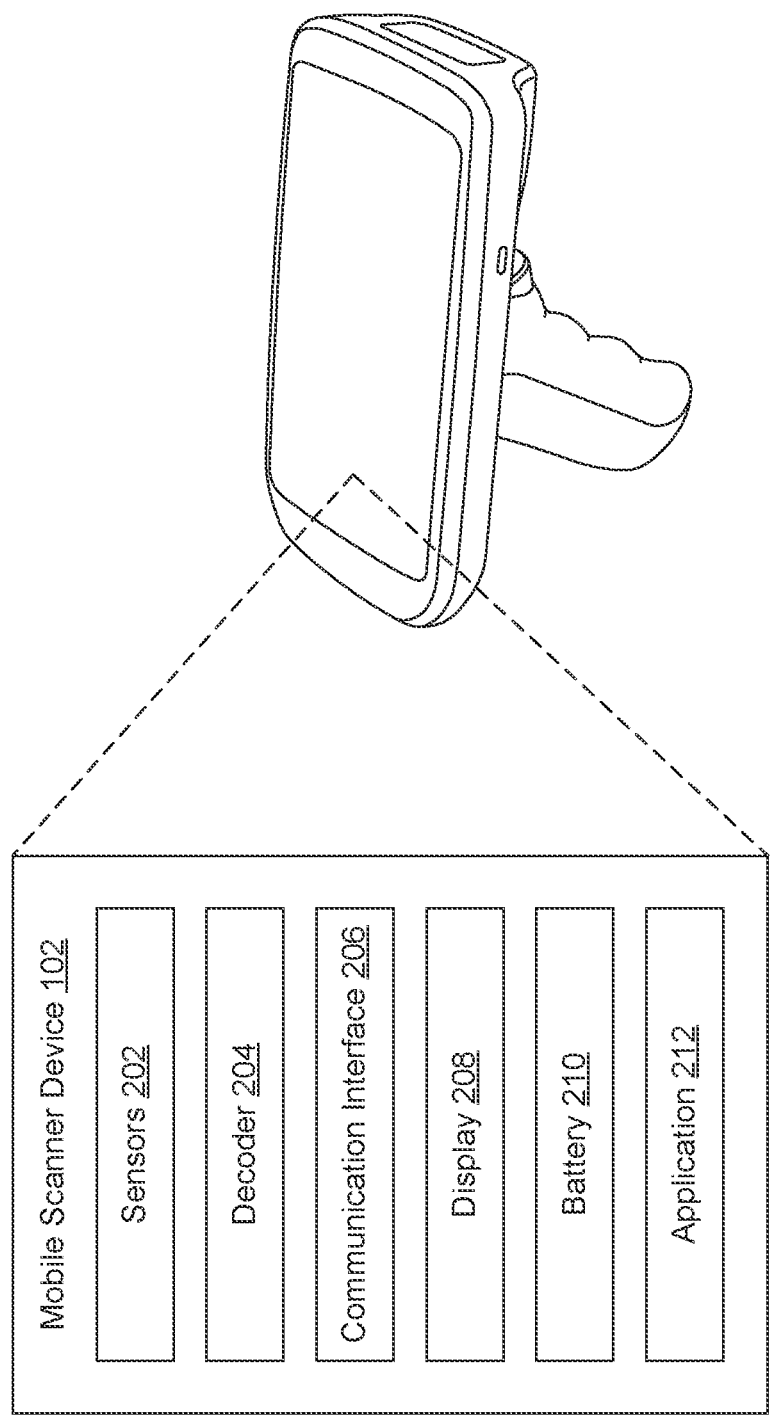
FIG. 2 is an example block diagram of a mobile scanning device, in accordance with an embodiment of the present disclosure.

The system environment 100 includes a mobile scanning device 102, a remote charging station 104, one or more remote databases 106, and network 110. Generally, the mobile scanner device 102 decodes barcodes, receives data, transmits data, and communicates data to a user or host system. To facilitate these actions, mobile scanner device 102 may include one or more hardware components, software components, firmware components, or any combination thereof. For example, as depicted in FIG. 2, mobile scanning device 102 may include one or more sensors 202, a decoder 204, communication interface 206, display 208, and battery 210.

Sensor(s) 202 may include input sensors such as image capturing sensor(s) (e.g., a camera), one or more user input devices (e.g., a keyboard, touch screen, a trigger, microphone, etc.), one or more accelerometers, one or more gyroscopes, one or more magnetometers, one or more GPS receivers, one or more Columb counters, one or more voltmeters, or any combination thereof. Sensor(s) 202 may also include output sensors such as one or more single wavelength LEDs, one or more multi-wavelength LEDs, one or more haptic sensors (e.g., eccentric rotating mass actuator), one or more speakers, or any combination thereof.

Decoder 204 may extract data or otherwise analyze data from one or more images received by, or captured by, the mobile scanning device 102. For example, decoder 204 may identify elements of a barcode within an image and convert the visual representation into a corresponding set of machine-readable data. The decoder 204 may identify and capture optical codes, such as two-dimensional codes (e.g., Quick Response (QR) codes), one-dimensional bar codes, as well as high density codes, Dot codes, watermarking (e.g., Digimarc), optical code recognition (OCR), or any other optically based machine-readable code within one or more images. For example, the decoder 204 may extract pixel data from the array of pixels within the image and analyze the data. The decoder 204 may be preprogramed with a one or more decoding libraries providing machine-readable instructions for decoder 204 to compute the decoded barcode from the pixel data.

Communication interface 206 may manage the receipt and transmission of data for the mobile scanning device 102. For example, the communication interface 206 may establish wireless communication channels with remote charging station 104, remote database 106, pointer device 108, or any combination thereof via a radio (e.g., radio 624 of FIG. 6). The wireless communication channels may be direct path connections (e.g., without intermediary routing) or indirect path connections (e.g., including one or more intermediary routing device).

Display 208 may be any display suitable for visual presentation of images based on machine-readable instructions. For example, display 208 may be a liquid crystal display (LCD), light emitting diode (LED) display, organic LED (OLED) display, or any other display. In some embodiments, display 208 may also include touch-based interactivity. For example, display 208 may include a resistive or capacitive touch panel, or any other suitable panel. Although described in relation to display 208, a panel that facilitates touch-based interactivity may also be considered an input sensor (e.g., sensor 202).

Generally, battery 210 converts chemical energy into electrical energy to power, or at least partially power, mobile scanning device 102. Battery 210 may be integrated with mobile scanning device 102 or removable from mobile scanning device 102 in some embodiments. As used in reference to the battery 210, a removable battery refers to a battery that, by design, can be connected with the mobile scanning device 102, disconnected, and replaced with another battery without compromising the integrity of the mobile scanning device other than removing a portion of the mobile scanning device's housing intentionally designed to allow access to the battery. An integrated battery refers to a battery that, by design, is not removable.

Battery 210 may include any suitable combination of chemicals in one or more cells. In some embodiments, battery 210 is rechargeable (e.g., the chemical process that produces the electrical energy is intentionally reversible). For example, battery 210 may be a Lead-acid, Zinc-air, Lithium polymer (Li—Po), Nickel-Cadmium (NiCad), Nickel-Metal Hydride (NiMH), Lithium Ion (Li-ion) battery, or any other suitable combination. Battery 210 may include computer readable memory in some aspects. The computer readable memory may store data related to the battery such as voltage, maximum current draw (e.g., amperage), storage capacity (e.g., ampere-hours), present capacity, or any combination thereof. The computer readable memory may also include model identification, compatibility information, number of charge/discharge cycles, date of manufacture, or any other relevant data.

Additionally, mobile scanning device 102 may include one or more software applications. For example, mobile scanning device 102 may include an application that provides an interface with remote database 106, such as an inventory tracking application. For another example, mobile scanning device 102 may include an application 212 that provides guided navigation (e.g., path finding) from a current location to a specified location. The application 212 may activate, or otherwise access data from, one or more hardware components of mobile scanning device 102. The application 212 may activate, or otherwise access data from, one or more components periodically, intermittently, continuously, or in response to programmatically defined triggering event. In at least one aspect, application 212 activate, or otherwise access data from, sensors 202, battery 210, communication interface 206, or any combination thereof. For example, application 212 may activate one or more GPS receivers, one or more Columb counters, one or more voltmeters, or any combination thereof. Similarly, in at least one aspect, application 212 accesses data from the computer readable memory of battery 210. Application 212 may analyze the data generated by sensors 202 or stored by battery 210 and initiate one or more processes. For example, application 212 may initiate one or more of the processes described in relation to FIGS. 4-9. Although depicted in FIG. 2 with a vertically protruding grip, mobile scanning device 102 may take any suitable form factor. For example, mobile scanning device 102 may be in a wearable device form factor (e.g., designed to be worn on a user's head, wrist, forearm, finger(s), or any other part of a user's body), a "candy bar" form factor, a "clam shell" form factor, or any other form factor intentionally designed to be used in a non-fixed location.

Figure 3A:
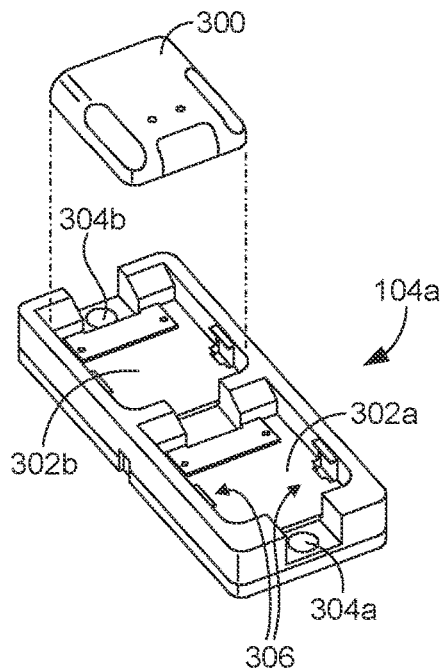
FIGS. 3A-3C depict example remote charging stations, in accordance with an embodiment of the present disclosure.
Figure 3C:
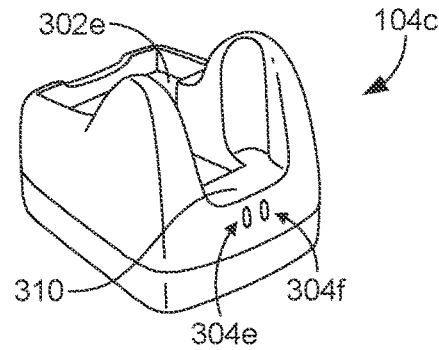
Figure 3B:
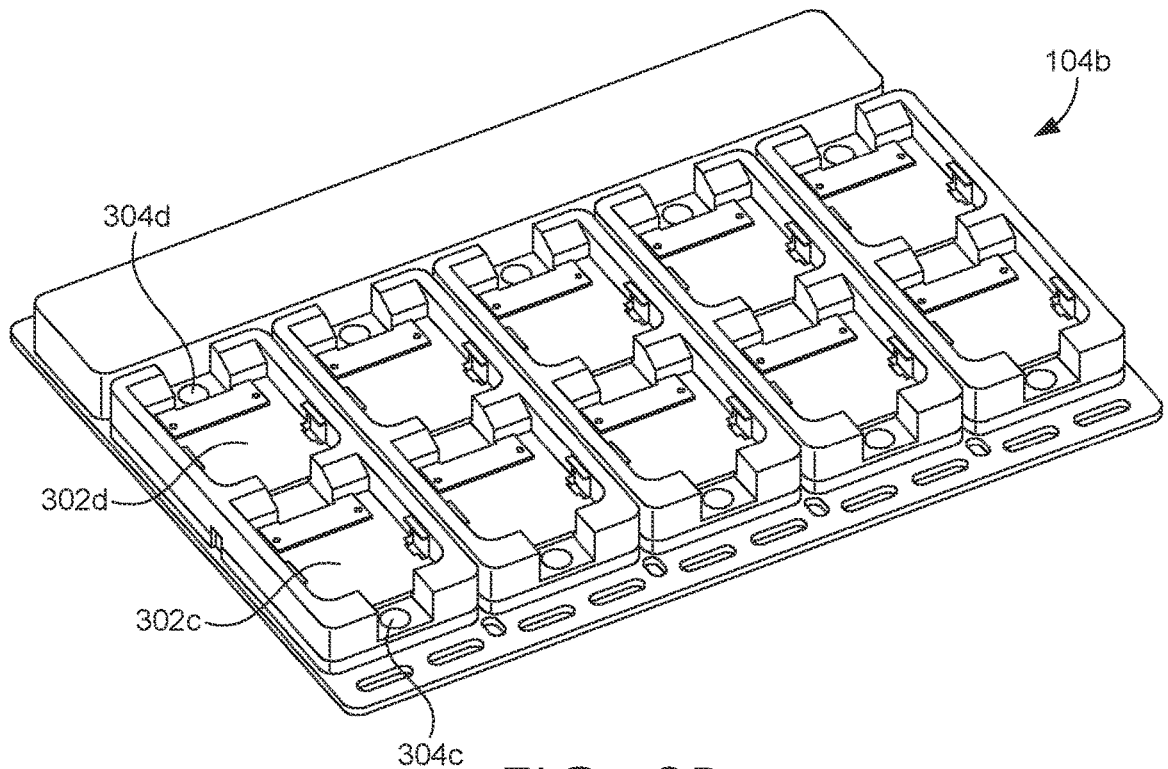

Returning briefly to FIG. 1, system environment 100 includes one or more remote charging stations 104. Generally, remote charging station 104 recharge (e.g., at least partially reverse the chemical reaction) of a rechargeable battery. For example, and turning to FIGS. 3A-3C, example remote charging stations are depicted, in accordance to some aspects described herein. As depicted in FIGS. 3A-3C, some aspects of remote charging station 104 recharge one or more removable battery (e.g., battery 210), one or more mobile scanning device coupled to a removable battery (e.g., mobile scanning device 102 including a removable battery 210), one or more a mobile scanning device with an integrated battery (e.g., mobile scanning device 102 including an integrated battery 210), or any combination thereof. To facilitate this, remote charging station 104 may include one or more charging ports. A charging port may be configured such that a battery or a mobile scanning device can be, at least temporarily, coupled to the remote charging station 104 and the battery recharged.

For example, FIG. 3A depicts a remote charging station 104a configured with two charging ports 302a and 302b for a battery, such as battery 300. For another example, FIG. 3B depicts a remote charging station 104b having ten charging ports (e.g., charging ports 302c and 302d). For yet another example, FIG. 3C depicts a remote charging station 104c configured with a mobile scanning device charging port 310 (for docking the entire mobile scanning device) and a battery charging port 302e (for docking and charging an individual battery). Additionally, remote charging station 104 may include one or more components configured to detect and monitor the charge status of an engaged battery or a mobile scanning device. For example, remote charging station 104 may include one or more Columb counters, one or more voltmeters, or any combination thereof. Charging may occur via physical connections (e.g., electrical contacts) between the component and the charging port, or wireless connections (e.g., wireless power charging) as known in the art.

In some aspects, one or more of the charging ports of a remote charging station may include a locking mechanism that is configured to engage a battery or mobile scanning device. The locking mechanism may be a mechanical, electromechanical, magnetic, or electromagnetic mechanism. In an active state, a locking mechanism prevents, or substantially prevents, the removal of a battery engaged in a charging port. For example, in an engaged state, locking mechanism 306 would substantially prevent the removal of battery 300 from remote charging station 104a. In an inactive (or deactivated) state, the locking mechanism allows the removal of a battery engaged in a charging port. For example, in an inactive/deactivated state, locking mechanism 306 would allow the removal of battery 300 from remote charging station 104a. Locking mechanism 306 may be controlled by one or more processors (not depicted) integrated with the remote charging station (e.g., remote charging station 104a). In at least one aspect, the locking mechanism be integrated with a locating guide. The locating guide may be one or more grooves, one or more slots, pin or set of pins, depression or set of depressions, or any similar physical element configured to assist a user with placement of a battery or mobile scanning device in a charging port. In some embodiments, locking may occur in response to the docked battery or mobile scanning device being charged until approved for removal. In some embodiments, locking may occur in response to the docked battery or mobile scanning device reserved for exchange until the user arrives to perform the exchange. This may prevent another user from inadvertently taking a reserved while the user is on their way to perform the exchange. When the user arrives (e.g., within some range) the charging station (or other mobile scanning device) may detect the presence of the device to be exchanged and cause the locking mechanism to disengage so that the exchange may be permitted. In some embodiments, the unlocking may be performed by some other authentication method (e.g., the user entering a code, etc.).

Returning briefly to FIG. 1, the remote charging station 104 may communicate data related to remote charging station 104, engaged batteries, and/or engaged mobile scanning devices to one or more components of system 100. For example, the remote charging station 104 may communicate data related to the current number of batteries and/or mobile scanning devices engaged with the remote charging station 104, the current charge state of each battery and/or mobile scanning device engaged with the remote charging station 104, the location of remote charging station 104, any other relevant data, or any combination thereof. The communication of data may be continuous, periodic, intermittent, or in response to a defined request command. To facilitate this communication, some embodiments of remote charging station 104 may include one or more of the components described in relation to computing device 1100 of FIG. 11. For example, some remote charging stations 104 may include one or more processors, one or more radios, and one or more input/output components. In at least one aspect, remote charging station 104 includes one or more radios (e.g., Radio 1124 of FIG. 11). The radio facilitates unidirectional and/or bidirectional communication with mobile scanning devices (e.g., mobile scanning device 102 of FIG. 1) and/or a wireless network (e.g., network 108). In aspects, the radio utilizes one or more transmitters, receivers, and antennas to facilitate the wireless communication. Illustrative wireless communication technologies include CDMA, GPRS, TDMA, GSM, Wi-Fi, Bluetooth, ZigBee, WiMAX, LTE, and the like. As can be appreciated, in various embodiments, radio 624 can be configured to support multiple technologies and/or multiple radios can be utilized to support multiple technologies.

Remote charging station 104 may also include output sensors such as one or more single wavelength LEDs, one or more multi-wavelength LEDs, one or more haptic sensors (e.g., eccentric rotating mass actuator), one or more speakers, or any combination thereof. The output sensors of remote charging station 104 may be activated in response to predefined triggers, such as those described in more detail in relation to FIGS. 4-9. However, generally the output sensors facilitate visual, auditory, or physical communication of information to a user related to the remote charging station. The output sensors may be associated with the remote charging station or a particular charging port.

Turning back to FIGS. 3A-3C for example, remote charging station 104a is depicted with LEDs 304a and 304b. As depicted, LED 304a is associated with charging port 302a and LED 304b is associated with charging port 302b. In other words, information may be visually communicated by LED 304a regarding charging port 302a or a battery engaged with charging port 302a. Similarly, information may be visually communicated by LED 304b regarding charging port 302b or a battery engaged with charging port 302b. Similarly, the LED 304c may visually communicate data related to charging port 302c, the LED 304d may visually communicate data related to charging port 302d, the LED 304e may visually communicate data related to charging port 302e, and the LED 304f may visually communicate data related to device charging port 310.

System environment 100 also includes one or more databases 106. Database 106 may maintain a record of information related to the system 100. For example, database 106 may maintain data related to the location of charging station 104 and mobile scanning device 102. The data related to the charging stations 104 may include the current charge state of each battery and/or mobile scanning device engaged with the remote charging station, the location of remote charging station, each associated battery's model identification, compatibility information (e.g., models of mobile scanning device the battery can be used with), number of charge/discharge cycles, date of manufacture, or any combination thereof. The data related to the mobile scanning devices 102 may include model information and user associations. Database 106 may additionally maintain data related to users of system 100 such as identification information, schedule information, user preferences, class (e.g., security level, job level, access permission, and so forth) information, any other user data, or any combination thereof. Database 106 may be maintained by one or more server(s). Generally, the one or more servers facilitate storage or use of barcode data decoded by mobile computing scanner device 102. For example, server may include one or more applications that facilitate inventory management or logistics (e.g., purchasing, ordering, or distribution). Additionally, server may include one or more databases configured to store decoded barcode data or other contextually relevant data (e.g., time stamps, location, identification of a scanner associated with the entry, and so forth). In some embodiments, database 106 may include one or more object database libraries. For example, the data base libraries may include relational databases maintaining data maps associating an object with barcode data.

Components of the one or more servers may include, without limitation, a processing unit, internal system memory, and a suitable system bus for coupling various system components with the server. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Network 110 facilitates communication between a mobile computing scanner device 102, one or more database 106, and any other remote device that may be configured to communicate with mobile computing scanner device 102. Network 110 may also facilitate communication between mobile scanning device 102 and one or more remote charging stations 104. Network 110 may include, without limitation, local area networks (LANs) and/or wide area networks (WANs). Such networking environments are commonplace in offices, enterprise-wide computer networks, intranets, and the Internet. In an embodiment, network 110 includes one or more devices configured to facilitate wireless communication between at least two other devices. For example, network 110 may include bidirectional wireless communication channels facilitated by Wi-Fi (e.g., 802.11 protocol), Bluetooth, ZigBee, 5G, or any other wireless communication protocol.

Figure 4:
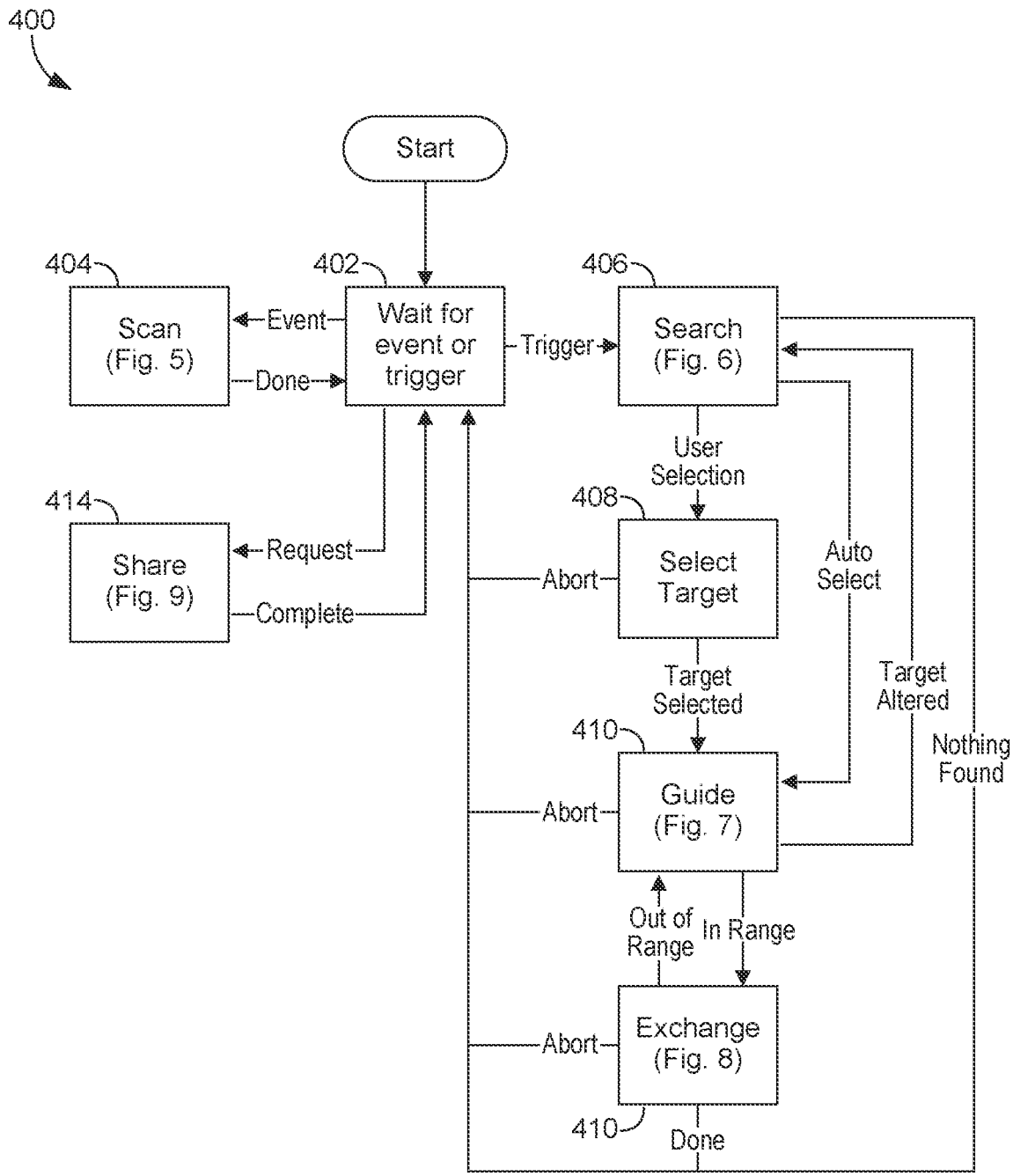
FIG. 4 includes a depiction of a process for the guided exchange of a mobile scanning device component, in accordance with an embodiment of the present disclosure.

FIG. 4 depicts a process 400 for locating and reserving replacement batteries or scanning devices. Process 400 may also include the guidance from a currently detected location to the location of a reserved replacement battery or scanning device. Each block of process 400, described herein, comprises a computing process that may be facilitated by hardware, firmware, software, or any combination thereof. For instance, various functions may be carried out by a processor executing instructions stored in memory. In addition, process 400 is described, by way of example, with respect to system 100 of FIG. 1 and the example mobile computing scanner device 102 of FIG. 2. However, this method may additionally or alternatively be executed by any one system, or any combination of systems, including, but not limited to, those described herein.

Some aspects of process 400 start at block 402 with a trigger or event. An event is a programmatically defined action, occurrence of trigger, detection of a state change, or any similar action. For example, an event may be defined as the occurrence of a predefined number of barcode scans by the mobile scanning device, a predefined duration of time, a received wireless communication, the detection that the mobile scanning device is at predefined location, the detection that the mobile scanning device has entered, exited, or crossed a predefined geo-fence, any combination thereof, or any similar action. A trigger is a class of event that initializes the search for a replacement component for the mobile scanning device (e.g., a battery or another mobile scanning device). In some embodiments, the trigger event may be the detection that the remaining battery capacity of a battery (e.g., battery 210) of a mobile scanning device (e.g., mobile scanning device 102) is equal to, or less than, a predetermined capacity (i.e., charge threshold). For example, an application of the mobile scanning device (e.g., application 212) may analyze data generated by one or more Columb counters, one or more voltmeters. Additionally, or alternatively, the application may periodically or intermittently generate an automatic triggering event. Likewise, in some embodiments, the application may generate a trigger based on a user input such as a specific request from the user to exchange a component.

In response to detection of an event of block 402, process 400 may initiate a scan of wireless signals at block 404 indicating potential components (e.g., batteries, mobile scanning devices, etc.) available for exchange with the mobile scanning device. Some embodiments of block 404 may include broadcasting a request for data, listening to signals broadcast by other devices, and local storage of data. Such data may be received from one or more charging stations, one or more peer devices (e.g., other mobile scanning devices), or any combination thereof.

Figure 5:
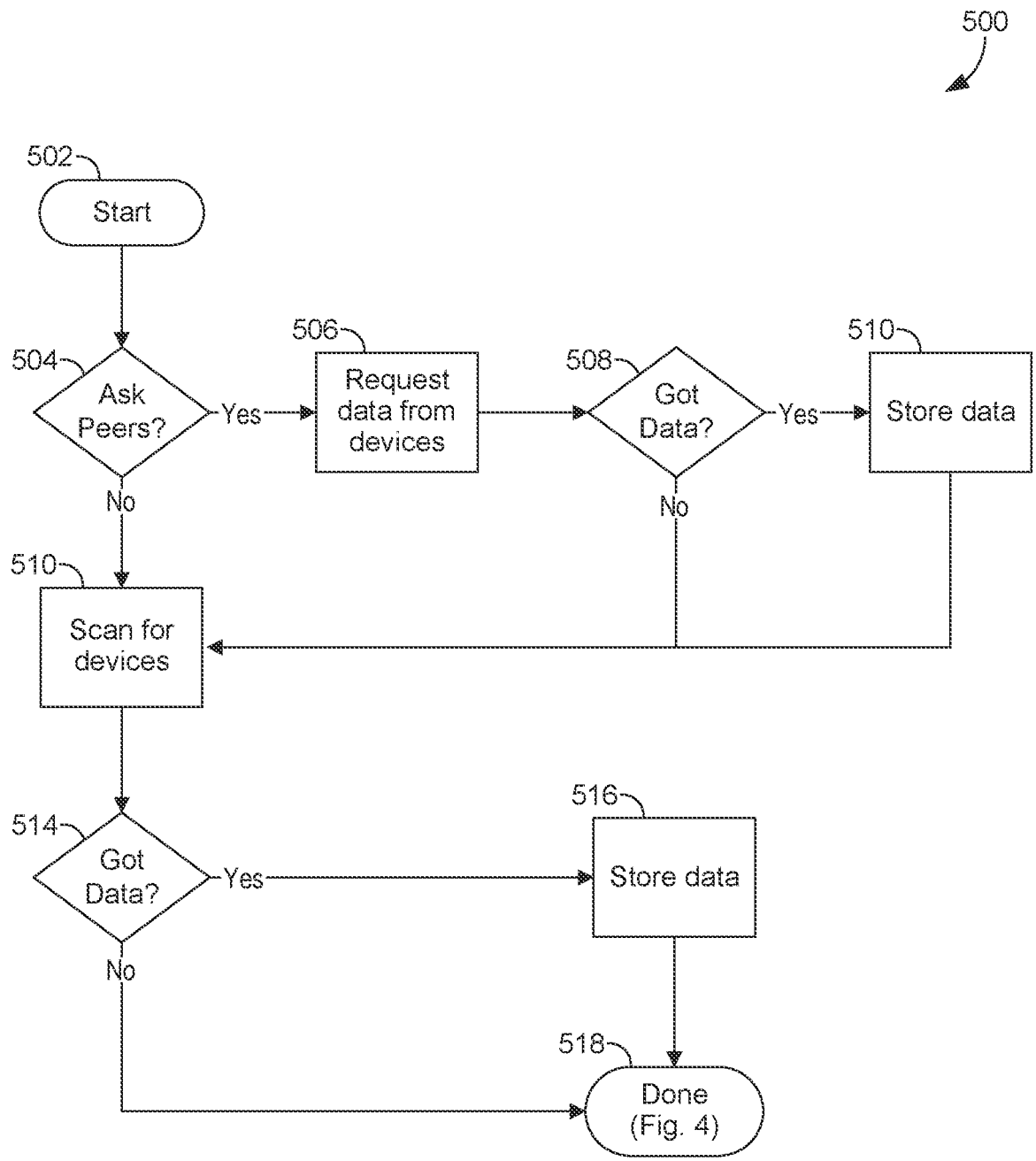
FIG. 5 is an example process for the acquisition of data corresponding to replacement components, in accordance with an embodiment of the present disclosure.

FIG. 5 depicts an example sub-process 500 in accordance with some aspects of block 402 of FIG. 4. For example, sub-process 500 may be initiated in response to an event. Sub-process 500 may begin at block 502 with a triggering event that initiates a request for battery exchange data. Such data may be received by one or more remote charging stations and/or one or more peer mobile scanning devices. In some embodiments, the mobile scanning device may prioritize data (or limit data) to that received from the one or more remote charging stations. In some embodiments, the mobile may first request data from the one or more remote charging stations and then request data from peer mobile scanning devices if no responses are received from remote charging stations (indicating that the remote charging stations are out of range). In some embodiments, the mobile scanning device may maintain local records regardless of source along with the timestamps associated with such data indicating the last update of such battery exchange data by either the remote charging stations and/or peer mobile scanning devices. Peer mobile scanning devices may share such battery exchange information (e.g., in a mesh network) which may be beneficial for mobile scanning devices that may be outside of the range of the remote charging stations.

In a particular aspect, the application may read locally maintained records of remote charging stations and their associated batteries/mobile scanning devices. Where the time stamp(s) associated with the most recently stored data indicates that the locally maintained records are new enough (e.g., updated less than a predetermined amount of time in the past) the application may retrieve the battery exchange information stored locally without needing to broadcast a request message. Where the time stamp(s) associated with the most recently stored data indicates that the locally maintained records are old (e.g., updated more than a predetermined amount of time in the past) the application may trigger the mobile scanning device to broadcast a request message. However, the determination of whether a request for data is necessary may vary based on any number of factors based on the environment. For example, the determination in a relatively large warehouse environment may rely on a first decision logic and the determination in a relatively small warehouse environment may rely on a second decision logic. Accordingly, the decision on whether to broadcast a request for battery exchange data (and whether the request may be answered by peer mobile scanning devices and/or remote charging stations, or whether locally stored data may suffice) may be configurable in some embodiments to account for the use case environment.

Where the decision logic of block 504 results in a determination that a request for data is to be broadcast, sub-process 500 proceeds to block 506. At block 506, the request is broadcast. The broadcast may be facilitated by one or more of any suitable wireless communication technique (e.g., CDMA, GPRS, TDMA, GSM, Wi-Fi, Bluetooth, ZigBee, WiMAX, LTE, and the like). The broadcast may include a request for particular information from recipient mobile scanning devices and/or a server maintaining a database (e.g., database 106). The requested information may include the current charge state of each battery and/or mobile scanning device engaged with the remote charging station(s), the location of remote charging station(s), each associated battery's model identification, compatibility information (e.g., models of mobile scanning device the battery can be used with), number of charge/discharge cycles, date of manufacture, or any combination thereof.

After broadcasting the request in block 504, the mobile scanning device may listen for wireless communication responses. At block 508, the application determines whether any data was received in response to the broadcast response. At block 510, received data is stored in the locally maintained record of replacement component data. In some aspects, data received by the mobile scanning device from other mobile scanning devices is stored locally with two time stamps (e.g., a time stamp associated with the time of receipt by the mobile scanning device and the time associated with receipt by the other mobile scanning device).

At block 512, some aspects of sub-process 500 includes scanning for wireless communications broadcast by one or more charging stations. The scan for devices may be facilitated by one or more radios of the mobile scanning device listening for any suitable wireless communication technique (e.g., CDMA, GPRS, TDMA, GSM, Wi-Fi, Bluetooth, Zig-Bee, WiMAX, LTE, and the like). For example, in some aspects, one or more remote charging stations may broadcast data related to each engaged battery, and/or engaged mobile scanning devices. The data may include the current charge state of each battery and/or mobile scanning device engaged with the remote charging station, the location of remote charging station, any other relevant data. For example, the remote charging stations may include data related to each associated battery's model identification, compatibility information (e.g., models of mobile scanning device the battery can be used with), number of charge/discharge cycles, date of manufacture, or any combination thereof.

Some embodiments of sub-process 500 include, at block 514, the application determining whether any data was received from in response to the broadcast response. At block 516, the received data is stored in the locally maintained record of replacement component data. In some aspects, data received by the mobile scanning device from other mobile scanning devices is stored locally with two time stamps (e.g., a time stamp associated with the time of receipt by the mobile scanning device and the time associated with receipt of the data by the mobile scanning device that broadcast the data). At block 518, some embodiments of sub-process 500 returns to block 402 of process 400.

Figure 6:
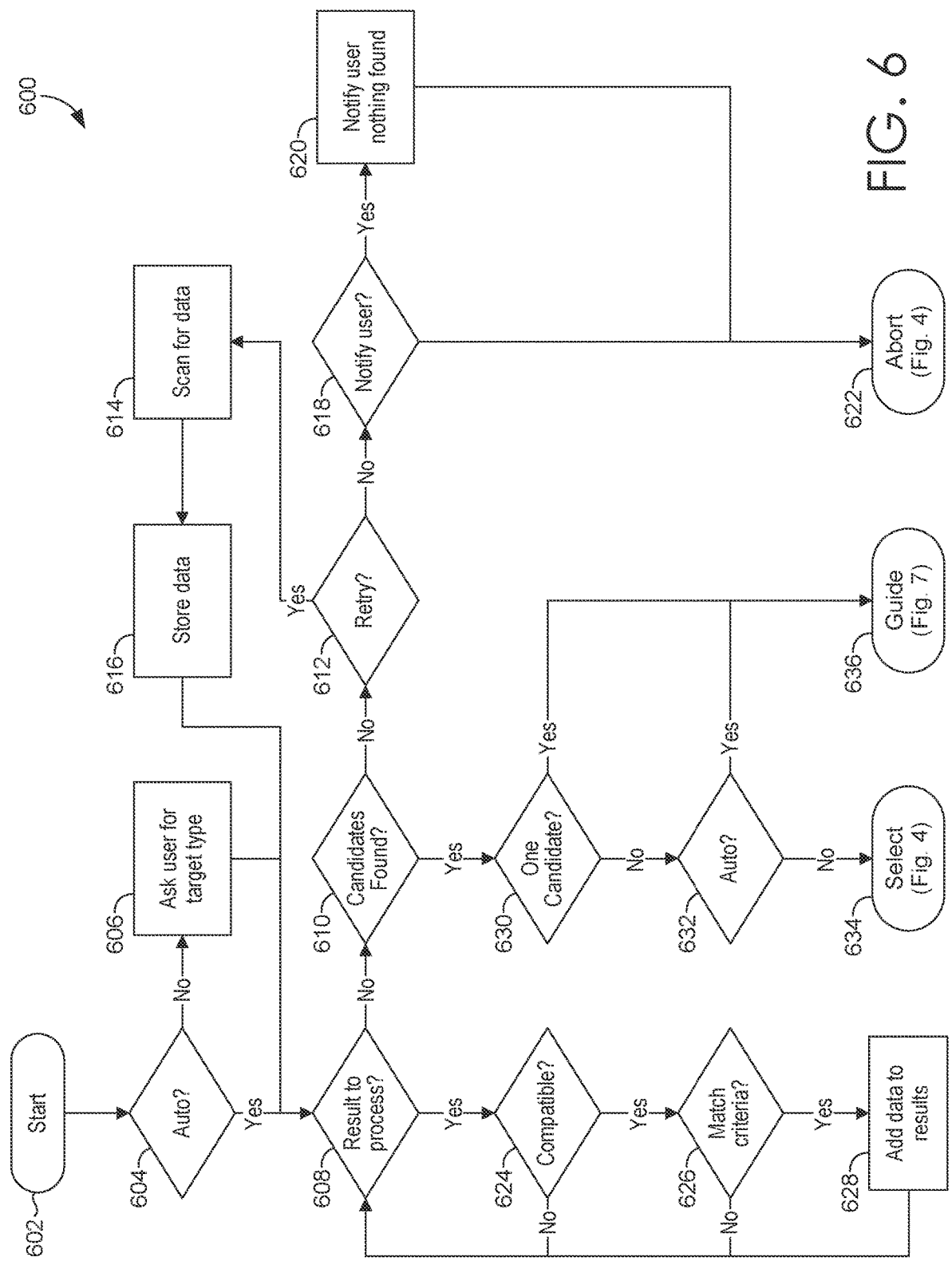
FIG. 6 is an example process for identification of a compatible replacement component, in accordance with an embodiment of the present disclosure.

Returning briefly to FIG. 4, at block 406 of process 400 the mobile scanning device searches for a replacement battery, replacement mobile scanning device, or both. The triggering event for block 406 may be the detection that the remaining battery capacity of a battery (e.g., battery 210) of a mobile scanning device (e.g., mobile scanning device 102) is equal to, or less than, a predetermined capacity. FIG. 6 depicts an example sub-process 600 in accordance with some aspects of block 406 of FIG. 4. For example, sub-process 600 may be triggered at block 602 in response to an application executed by a mobile scanning device detecting that the remaining battery capacity of the mobile scanning device's battery is equal to, or less than, a predetermined capacity. Additionally, or alternatively, sub-process 600 may be triggered based at least in part on a temperature change, a predefined time of day (e.g., end of a user's shift, beginning of a user's shift, the mid-point of a user's shift), a predefined duration of time, detection of a received wireless communication, the detection that the mobile scanning device is at predefined location, the detection that the mobile scanning device has entered, exited, or crossed a predefined geo-fence, predefined user input, any combination thereof, or any similar action.

Sub-process 600, at block 604, may include a determination whether automatic replacement component selection is active. Automatic replacement component selection uses predefined rules to automatically select a replacement battery or mobile scanning device. The predefined rules may vary based on any number of factors based on the environment in which mobile scanning device and remote charging station is used. For example, the rules in a relatively large warehouse environment may rely on a first set of logic and the determination in a relatively small warehouse environment may rely on a second set of logic. Where automatic replacement component selection is not active sub-process 600 may proceed to block 606. At block 606, the application presents an interactive menu including options to locate a replacement battery, locate a replacement mobile scanning device, locate an empty charging port, delay/cancel location of a replacement component, or any similar options. In contrast, wherein automatic replacement component selection is active sub-process may proceed to block 608.

At block 608, a decision point may be used to determine if any new replacement component data was added to the locally saved data that was not previously analyzed by the application. Where previously unanalyzed locally saved data is not detected by the application, block 608 proceeds to block 610. At block 610, the application of the mobile scanning device identifies a set of compatible candidate targets (e.g., each of the compatible replacement components or empty port where the mobile scanning device or currently used battery). The application may determine compatibility in any suitable way. For example, in some aspects the application compares the mobile scanning device's device model, hardware version, software version, connection type with the locally saved data associated with the selected type (e.g., replacement batteries, replacement mobile devices, empty charging ports). Where candidate targets are not identified by the application within the locally stored data, block 610 may proceed to block 612.

At block 612, the application determines whether to retry identification of a candidate target. The application may automatically make the determination to retry or not retry in any suitable manner using predefined rules. In some aspects, the application may present the user an option of whether or not to retry. Where a retry is not attempted, the application determines if a notification is needed for the user at block 618 and provides the notification at block 620. At block 622, the application aborts sub-process 600 and may return to process 400 of FIG. 4 in some aspects. Returning to block 612, when the application attempts to retry locating a replacement component or empty charging port sub-process 600 proceeds to block 614. At block 614, the application may scan for additional data from other mobile scanning devices or remote charging stations, such as is described in accordance with sub-process 500 in FIG. 5. The data detected by the application of the mobile scanning device are stored locally in block 616.

Returning to block 610, where candidate targets are identified by the application sub-process 600 proceeds to block 630. The application determines if one or more candidate replacement components or empty charging ports have been identified at block 630. Where only one candidate has been identified block 630 may proceed to block 636 and activate a guidance sub-process, such as sub-process 700 of FIG. 7. Where more than one candidate replacement component or empty charging port has been identified, the application may proceed to block 632. At block 632, the application determines whether automatic selection is enabled. Where automatic selection is enabled a candidate component is automatically selected and block 623 proceeds to a guidance sub-process, such as sub-process 700 of FIG. 7. The application may automatically select a candidate component in any suitable manner. For example, and in some aspects, the application may automatically select the candidate component based on the candidate closest to the mobile scanning device (e.g., closest distance), the candidate with the predicted shortest time to reach (e.g., lowest estimated time to reach by a guidance sub-process), the candidate with the largest maximum capacity, the candidate with a predetermined battery composition, the candidate with the highest current charge, the candidate with a preferentially weighted feature (e.g., Ethernet availability, lock compatibility, and so forth). Where automatic selection is not enabled, block 632 proceeds to provide candidate selection options to a user at block 634. In some aspects, block 634 of sub-process 600 may activate a selection process, such as block 408 of FIG. 4.

Returning to block 608, where a target type is selected block 608 proceeds to block 624. At block 624, the application may determine if the unanalyzed replacement components and/or empty charging ports are compatible. The application may determine compatibility in any suitable way. For example, in some aspects the application compares the mobile scanning device's device model, hardware version, software version, connection type with the locally saved data associated with the selected type (e.g., replacement batteries, replacement mobile devices, empty charging ports). Where the newly analyzed replacement components are not compatible, block 624 returns to block 608. Otherwise, block 624 proceeds to block 626 and determines whether the compatible components match the target (e.g., the compatible components are candidates for the targeted replacement). Where the compatible components match the target, the components are added to the candidate results in block 628, otherwise block 626 returns to block 608.

In some embodiments, the candidate results may be generated locally by the mobile scanning device or other device using criteria based on the needs other factors related to the specific mobile scanning device. In some embodiments, the candidate results may be generated by another device (e.g., host computer that manages the system) that has the benefit of analyzing system data related to all network devices (e.g., both mobile scanning devices and charging stations). In some embodiments, such a system level selection may analyze all data in real time (e.g., data of both the mobile scanning devices as well as data of the charging stations) that may be used to predict both when an exchange may occur and which charging station may be used for such an exchange. In such case, this system level analysis (e.g., machine learning, neural networks, etc.) may be used to optimize exchange decisions by holding off on a particular battery exchange if a different device would be better served by that exchange (based on a prediction of that devices needs even if no formal exchange request has been made).

Returning to FIG. 4, at block 408 a candidate target is selected by a user. In some aspects, the application presents an interactive menu including options to select one of the candidate targets. The menu may include data relevant to each candidate target. For example, the menu may display the candidate closest to the mobile scanning device (e.g., closest distance), the candidate with the predicted shortest time to reach (e.g., lowest estimated time to reach by a guidance sub-process), the candidate with the largest maximum capacity, the candidate with a predetermined battery composition, the candidate with the highest current charge, the candidate with a preferentially weighted feature (e.g., Ethernet availability, lock compatibility, and so forth). Once a candidate target is selected, block 408 may proceed to a guidance sub-process at block 410. In some embodiments, the candidate target may be selected automatically by the mobile scanning device and/or other system level device as described above.

Figure 7:
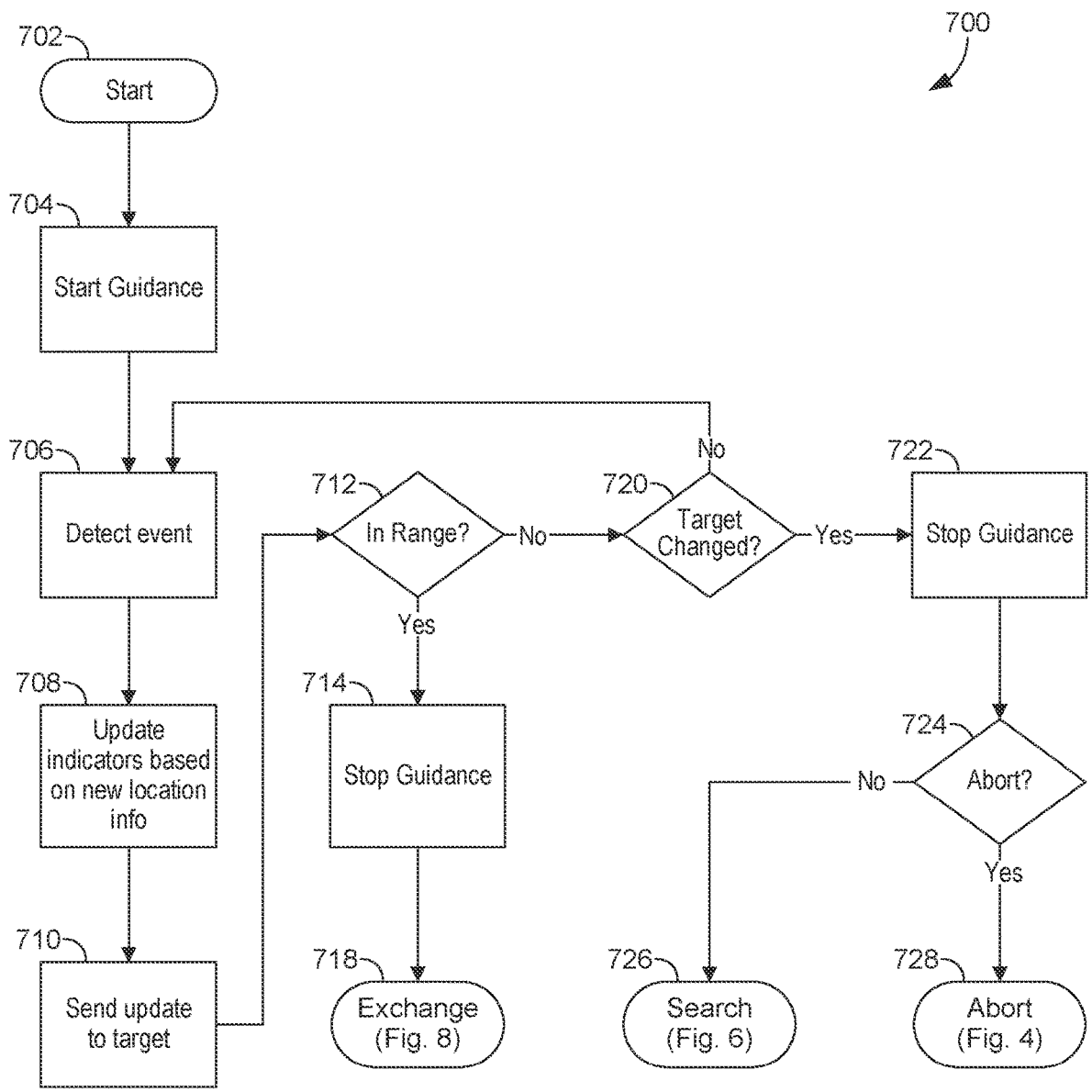
FIG. 7 is an example process for guidance from a current location to a selected (e.g., targeted) replacement component for a mobile scanning device, in accordance with an embodiment of the present disclosure.

Turning to FIG. 7, a guidance sub-process 700 is depicted in accordance to some of the aspects described herein. FIG. 7 depicts an example sub-process 700 in accordance with some aspects of block 410 of FIG. 4. Generally, guidance sub-process 700 provides a dynamically updated map from the mobile scanning device to the target. In some embodiments, sub-process 700 is facilitated by location data stored locally by the mobile scanning device. In some embodiments, sub-process 700 includes bi-direction communication between a mobile scanning device and the remote charging station associated with the target. Each block of sub-process 700, described herein, comprises a computing process that may be facilitated by hardware, firmware, software, or any combination thereof. For instance, various functions may be carried out by a processor executing instructions stored in memory. In addition, sub-process 700 is described, by way of example, with respect to system 100 of FIG. 1 and the example mobile computing scanner device 102 of FIG. 2. However, this method may additionally or alternatively be executed by any one system, or any combination of systems, including, but not limited to, those described herein.

Some aspects of sub-process 700 being at block 702. Block 702 may be initiated in any suitable way. For example, a target may be automatically or manually selected in an application process or sub-process. Upon selection of a target, sub-process 700 may start guidance at block 704. The guidance may start with the application presenting a map on the mobile device display. Block 704 may also include activation of one or more LEDs on the mobile scanning device (e.g., mobile scanning device 102 of FIG. 1), the remote charging station (e.g., remote charging station 104 of FIG. 1), or a combination of both. Block 704 may also include modification of the signal broadcast by the remote charging station. Additionally, or alternatively block 704 may include audio indications (e.g., directional noise or 3-dimensional audio), the initiation of haptic feedback. The guidance may be dynamically updated as the position of the mobile scanning device changes (e.g., gets closer to, or farther from, the remote charging station associated with the target).

The guidance may be facilitated by one or more mapping algorithms. For example, some aspects may use a modified Dijkstra algorithm. The cost of the path from the mobile scanning device to the remote charging station associated with the target may computed based on the distance between nodes, an estimate of the remaining usage time of the mobile scanning device, the estimated usage time of the target, the scheduled time remaining on the users shift.

Sub-process 700 may also include, at block 706, detection of an event by the mobile scanning device. The event may be programmatically defined action, occurrence of trigger, detection of a state change, or any similar action. For example, the event may be defined as a predefined duration of time, a received wireless communication, or the detection that the mobile scanning device is at predefined location, the detection that the mobile scanning device has entered, exited, or crossed a predefined geo-fence, any combination thereof, or any similar action. In a particular aspect, the event is detection that the mobile scanning device crossed a geo-fence encompassing the remote charging station associate with the target. In response to detection of an event, sub-process 700 may update the guidance indicators at block 708. For example, the one or more LEDs on the mobile scanning device (e.g., mobile scanning device 102 of FIG. 1), the remote charging station (e.g., remote charging station 104 of FIG. 1), or a combination of both may change. Additionally, or alternatively, the mobile scanning device and/or the remote charging station may emit audio indications alert the user that the user is relatively close to the remote charging station or draw user's attention to the remote charging station. Similarly, the event may cause the application to initiate haptic feedback. At block 710, some aspects of sub-process 700 include communicating an update of the mobile scanning device's location to the remote charging station. The application may determine whether the mobile scanning device is within a predetermined range of the remote charging station, at block 712. The predetermined range may be defined in any suitable way. For example, the predetermined range may be defined as within a distance regardless of physical obstacles (commonly referred to as "as the crow flies"), within an estimated travel time, within a path distance, or any combination thereof. Where the application determines that the mobile scanning device is in range, the application may stop the guidance at block 714 and activate an exchange sub-process at block 718. Alternatively, where the application determines that the mobile scanning device is not within the predetermined range sub-process 700 proceeds to block 720.

Sub-process 700 includes, at block 720, the application determining whether the target has changed (e.g., remains available for exchange). The application may exchange communications with the remote charging station associated with the current target to confirm the targeted battery, mobile scanning device, or charging port is still available. The communications may be exchanged in any suitable manner. Where the target has not changed, the sub-process 700 may return to block 706. Where the target has changed (i.e., is no longer available) sub-process 700 may stop the guidance at block 722 and proceed to determine if the sub-process 700 needs to be aborted at block 724. The determination to abort completely (e.g., return to block 402 of FIG. 4) or return to sub-process to identify a target (e.g., sub-process 600 of FIG. 6) may be based on a predetermined rule set. The rule set may be configured in any suitable manner. Alternatively, the application may present an interactive menu providing the user with the option of locating a new target or abort completely. Where locating a new target is selected, sub-process 700 may proceed to block 726, which may activate sub-process 600 of FIG. 6. Similarly, where the determination is made to completely abort the target guidance sub-process, the sub-process 700 may proceed to block 726, which may return the application to block 402 of FIG. 4.

Figure 8:
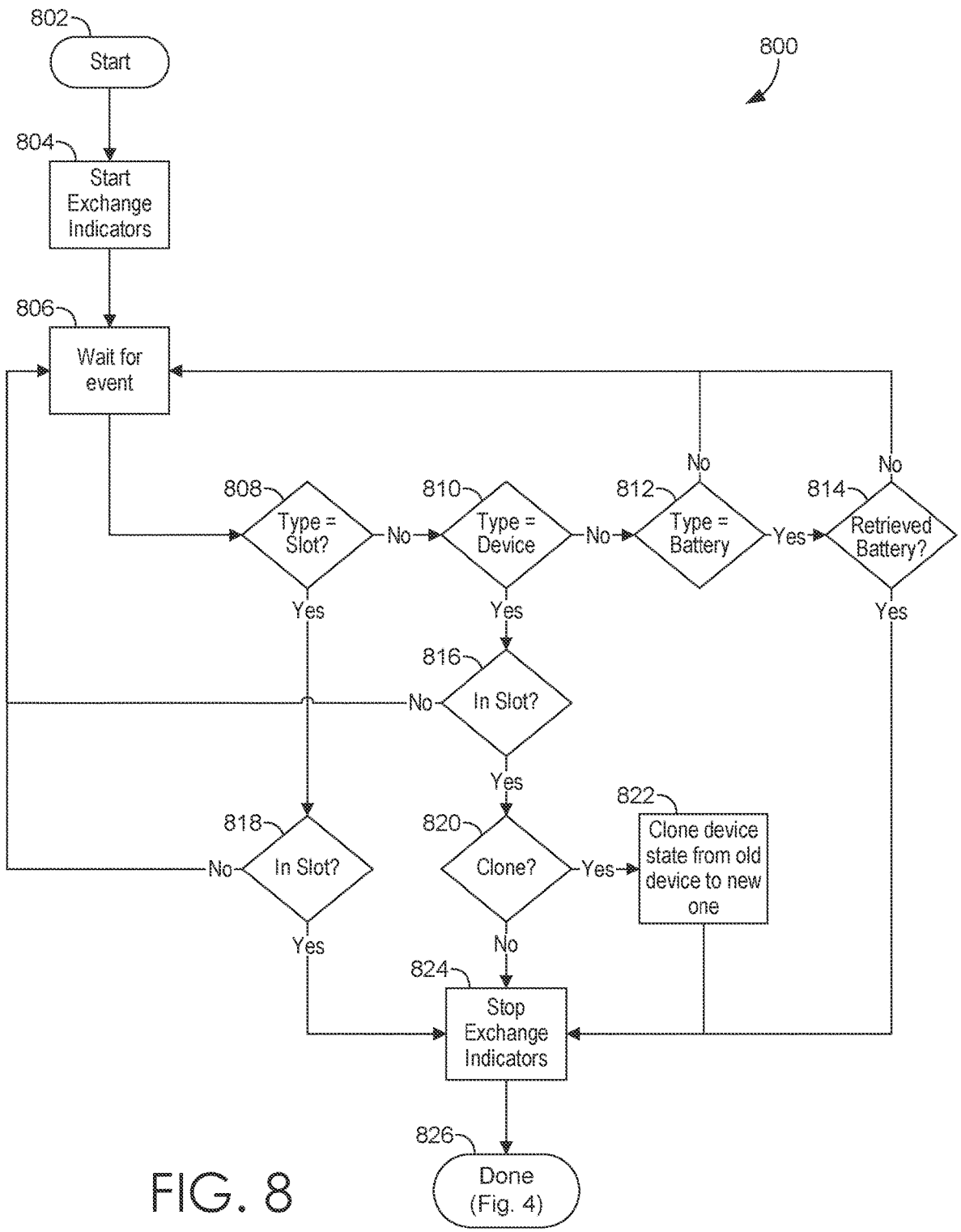
FIG. 8 is an example process for the exchange of the current component and the target replacement component, in accordance with an embodiment of the present disclosure.

Turning to FIG. 8, an example exchange sub-process 800 is depicted, in accordance with aspects described herein. FIG. 6 depicts an example sub-process 800 in accordance with some aspects of block 412 of FIG. 4. Generally, sub-process 800 facilitates the physical exchange of the currently used mobile scanning device or battery with the target mobile scanning device or battery. Sub-process 800 may include activation of visual indicators of the remote charging station, the target, or a combination of both. Some aspects of sub-process 800 begins at block 802. At block 804, sub-process 800 includes initiating an exchange indicator on the remote charging station, the charging port, the target, the mobile, or any combination thereof. The exchange indicator may include activating an output sensor associate with the remote charging station, the charging port, the target, the mobile, or any combination thereof. For example, an exchange indicator may include an emission of a predetermined a color (e.g., a wavelength of light), a series of pulses (e.g., a defined set of on and off cycles), a cycle of colors, or any combination thereof. For another example, an exchange indicator may include a tone, cycle of tones, a series of tones, or any combination thereof. For yet another example, an exchange indicator may include a haptic pulse, series of pulses, a pattern of multiple pulses with varying duration or intensity. To initiate the exchange indicator, the application may transmit, directly or indirectly, a signal to the remote charging station in any suitable manner. For example, in at least one aspect, the application initiates a Bluetooth pair with the remote charging station associated with the target. Once the pair is established, the application may transmit a command that initiates an exchange indicator. The exchange indicator may continue at block 806 until an event is detected. In some aspects, the event includes user input confirming the exchange. For example, the application may present instructions on the display of the mobile scanning device for a user to press a button on the mobile scanning device.

At blocks 808-814, sub-process 800 determines the type of the target associated with the exchange (e.g., a mobile scanning device, a battery, or an empty charging port). For example, at block 808 the application determines if the target is an empty charging port. Where the target is an empty charging port, the application may proceed to block 818. At block 818, process 800 determines if the target charging port is empty and where it is empty, process 800 returns to block 806. Where the charging port is not empty block 818 progresses to block 824.

At block 810, the application determines if the target is a mobile scanning device. Where the target is determined to be a mobile scanning device, the application of the mobile scanning device may establish a bi-directional communication link with the target mobile scanning device. Additionally, the application may broadcast a signal to the remote charging station disabling (or deactivating) a locking mechanism of the charging port currently engaged with the target mobile scanning device. At block 816, the mobile scanning device requests confirmation that the target mobile scanning device has been removed from the charging port of the remote charging station. This may be confirmed by the remote charging station or an application executed by the target mobile scanning device. If confirmation is received by the mobile scanning device determines if the target charging port is empty or the mobile scanning device determines that it is engaged with the target charging port (i.e., the charging port previously engaging the target mobile scanning device) process 800 progresses to block 820. Otherwise, process 800 returns to block 806. Where the charging port is not empty block 818 returns to block 806. At block 820, the application of the mobile scanning device and the target scanning device determine if the configuration (e.g., user settings, user preferences, permissions, identification information, schedule information, security level, access permission, and so forth) of the mobile scanning device can be cloned to the target mobile scanning device. In other words, the application facilitates cloning the state of the mobile scanning device to the target scanning device during the exchange at block 822. This may reduce the interruption of user time that traditional device replacement may cause.

At block 812, the application determines if the target is a battery. Where the target is a battery, block 812 includes disabling (or deactivating) a locking mechanism of the charging port currently engaged with the target battery. In other words, the application facilitates the selective disengagement (e.g., unlocking) of the locking mechanism preventing removal of the battery by a user with another mobile scanning device. For example, the application may cause the mobile scanning device to broadcast a signal, directly or indirectly, to the remote charging station disabling (e.g., disengaging or deactivating) a locking mechanism of the charging port currently engaged with the target battery. The signal may be in any suitable frequency and using any suitable protocol. For example, in at least one aspect the mobile scanning device may broadcast one or more Bluetooth signals including computer readable instructions to disable the locking mechanism. At block 814, process 800 may return to block 806 or progress to block 824 depending on detection or determination that the target battery has been removed from the charging port of the remote charging station.

Some aspects of process 800, at block 824, include stopping the exchange indicators. The exchange indicators (e.g., those started in block 804) may be deactivated in response to the application determining that the targeted exchange was completed. Once the exchange indicators are deactivated process 800 may return, at block 826, to process 400 of FIG. 4.

Figure 9:
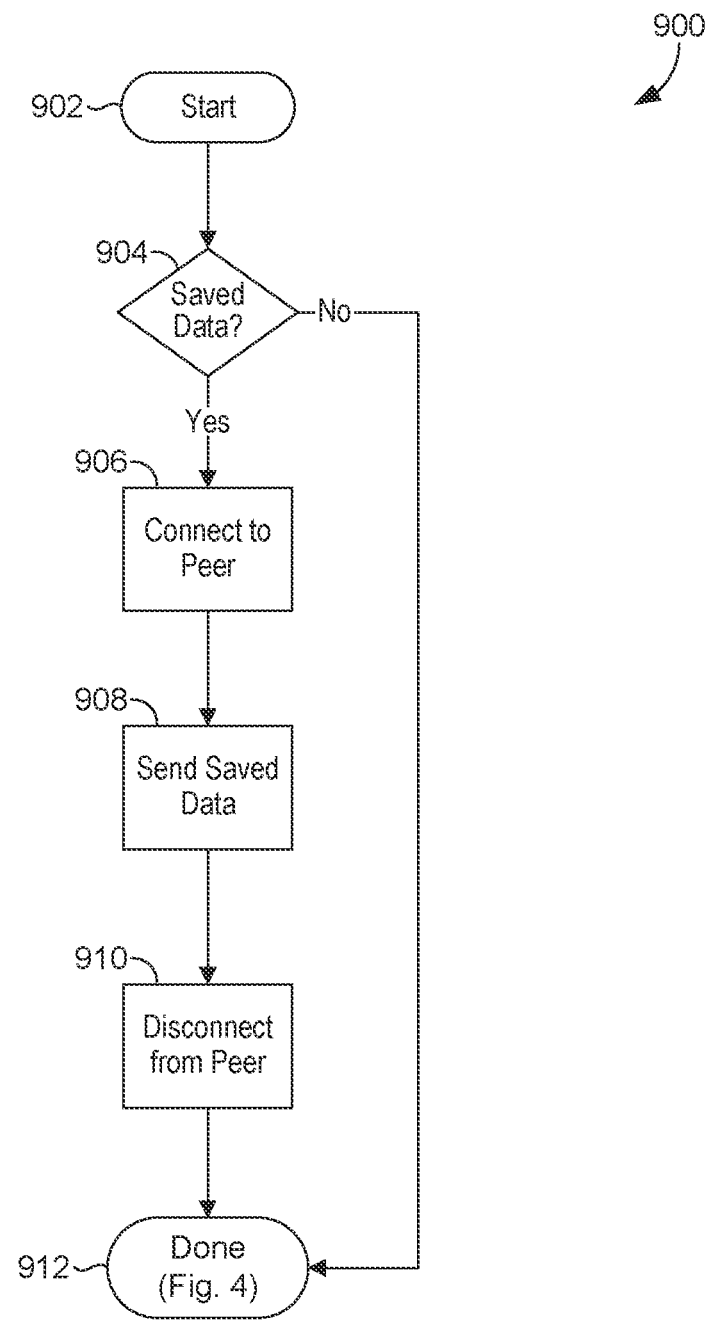
FIG. 9 is an example process for communicating locally stored data with other mobile scanning devices, in accordance with an embodiment of the present disclosure.

Turning to FIG. 9, a process 900 for mobile scanning device data share in a peer-to-peer (e.g., mesh) network arrangement, in accordance with some aspects herein. Each block of process 900, described herein, comprises a computing process that may be facilitated by hardware, firmware, software, or any combination thereof. For instance, various functions may be carried out by a processor executing instructions stored in memory. In addition, process 900 is described, by way of example, with respect to system 100 of FIG. 1 and the example mobile computing scanner device 102 of FIG. 2. However, this method may additionally or alternatively be executed by any one system, or any combination of systems, including, but not limited to, those described herein. In some aspects, process 900 begins at block 902 with the detection of a request for data from other a mobile scanning device (e.g., in response to receiving a signal generated as part of process 500 of FIG. 5).

At block 904, the recipient device determines what locally saved data relates to one or more remote charging stations. For example, the locally stored data may include the current charge state of each battery and/or mobile scanning device engaged with one or more remote charging station(s), the location of remote charging station(s), each associated battery's model identification, compatibility information (e.g., models of mobile scanning device the battery can be used with), number of charge/discharge cycles, date of manufacture, or any combination thereof. Where data is locally saved on the device that received the request signal, process 900 proceeds to block 906. Otherwise, at block 912, the mobile scanning device returns to process 400 of FIG. 4.

At block 906, process 900 includes connecting with a peer (e.g., a mobile scanning device). The connection may be facilitated by any suitable wireless communication technique. For example, the receiving mobile scanning device and the broadcasting mobile scanning device may use a traditional Bluetooth handshake to establish bi-directional communication link. At block 908, the mobile scanning device communicates the data stored locally via the bi-directional communication link. At block 910, the mobile scanning device terminates the bi-directional communication link and at block 912, the mobile scanning device returns to process 400 of FIG. 4.

Figure 10:
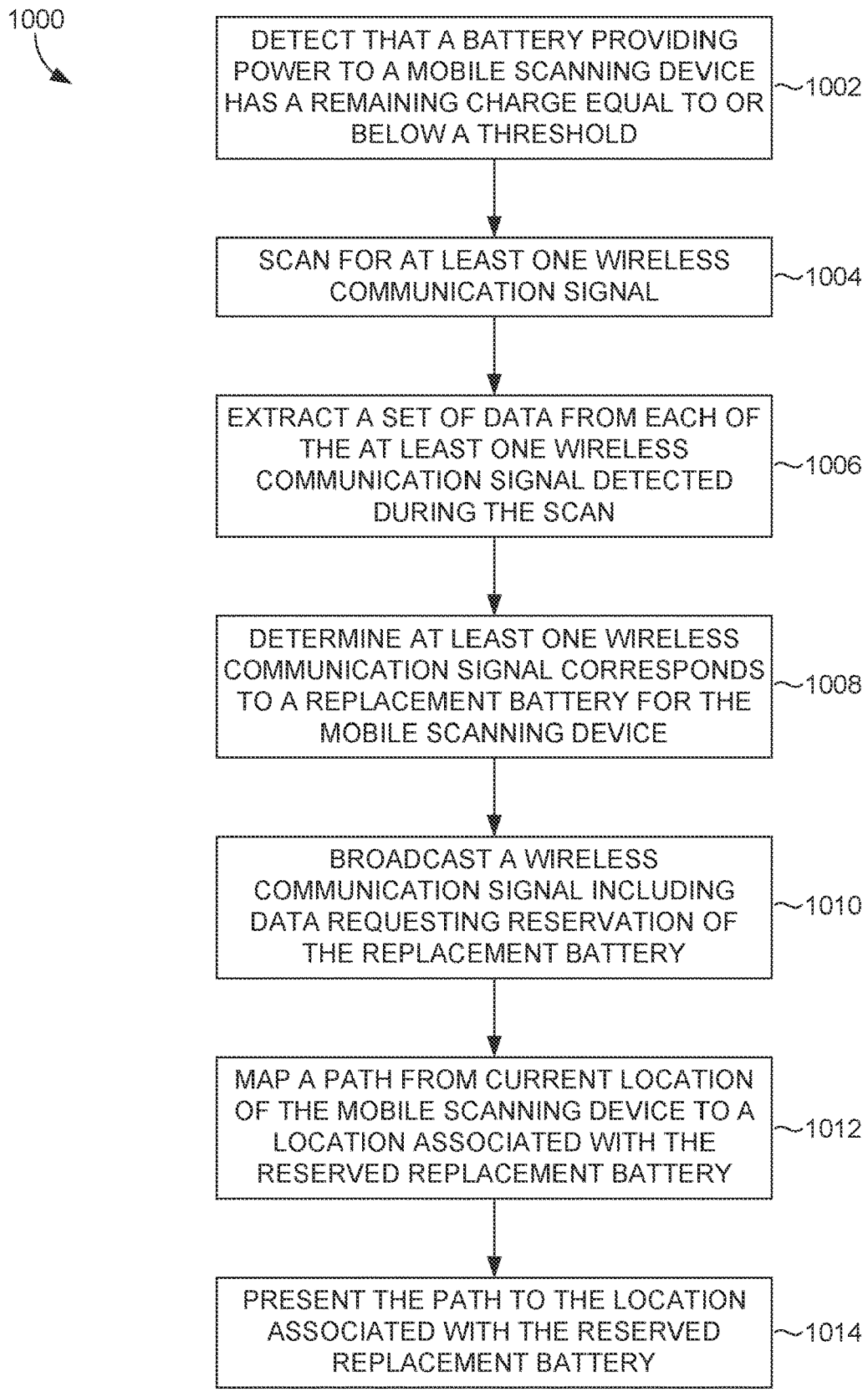
FIG. 10 is an example method for the guided replacement of a mobile scanning devices battery, in accordance with an embodiment of the present disclosure.

Turning to FIG. 10, an example method for the guided exchange of a mobile device is provided in accordance with some aspects described herein. Each block of method 1000, described herein, comprises a computing process that may be facilitated by hardware, firmware, software, or any combination thereof. For instance, various functions may be carried out by a processor executing instructions stored in memory. In addition, method 1000 is described, by way of example, with respect to system 100 of FIG. 1 and the example mobile computing scanner device 102 of FIG. 2. However, this method may additionally or alternatively be executed by any one system, or any combination of systems, including, but not limited to, those described herein.

Method 1000, at block 1002, includes detecting that a battery providing power to a mobile scanning device has a remaining charge equal to or below a charge threshold. For example, a sensor of the mobile scanning device 102 may detect the present capacity of the battery providing power to the mobile scanning device. The present capacity may be compared to a defined threshold. The charge threshold may be defined based, in part, of on the temperature detected by a sensor of the mobile scanning device, the time of day, the current location of the mobile scanning device, or a rate of power consumption for the mobile scanning device.

Method 1000, at block 1004, includes scanning for at least one wireless communication signal. For example, mobile scanning device 102 may listen to signals broadcast by a remote charging station 104 via a wireless communication channel facilitated by network 110. Alternatively, or additionally, block 1004 may include requesting data from one or more other mobile scanning devices.

Method 1000, at block 1006, includes extracting a set of data from each of the at least one wireless communication signal detected during the scanning. Method 1000, at block 1008, includes determining which of the at least one wireless communication signal corresponds to a replacement battery for the mobile scanning device, based on the extracted data. Method 1000, at block 1010, includes broadcasting a wireless communication signal including data requesting reservation of the replacement battery. For example, mobile scanning device 102 may broadcast a signal to a remote charging station requesting that an identified charging port, replacement battery, or replacement device be reserved for (e.g., allocated to) mobile scanning device 102.

Method 1000, at block 1012, includes mapping a path from a current location of the mobile scanning device to a location associated with the reserved replacement battery. The mobile scanning device 102 may determine the location of the remote charging station based on data received by the mobile scanning device in block 1004. For example, the mobile scanning device 102 may determine the location based in part on the received signal strength indicator (RSSI) computed from the received signals of a remote charging station. Additionally, or alternatively, the location may be determined based on data stored locally by the mobile scanning device 102. Method 1000, at block 1014, includes presenting, via a display integrated with the mobile scanning device, the path to the location associated with the reserved replacement battery.

Figure 11:
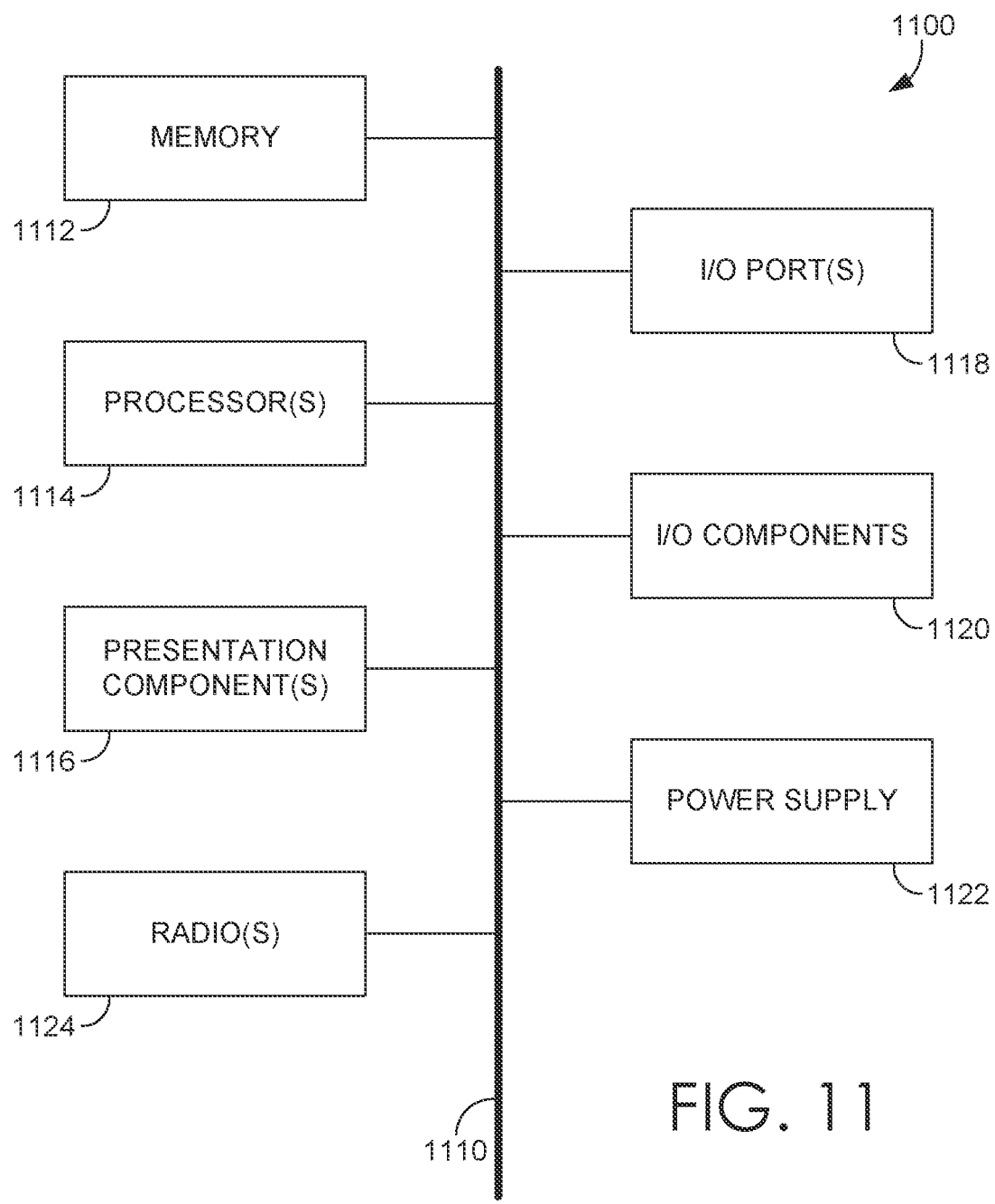
FIG. 11 is an example computing device, in accordance with an embodiment of the present disclosure.

Turning to FIG. 11, computing device 1100 includes bus 1110 that directly or indirectly couples the following devices: memory 1112, one or more processors 1114, one or more presentation components 1116, input/output (I/O) ports 1118, I/O components 1120, and power supply 1122. Bus 1110 represents what may be one or more busses (such as an address bus, data bus, or combination thereof). Although the devices of FIG. 11 are shown with lines for the sake of clarity, in reality, delineating various components is not so clear, and metaphorically, the lines would more accurately be grey and fuzzy. For example, one may consider a presentation component such as a display device to be one of I/O components 1120. In addition, processors, such as one or more processors 1114, have memory. The present disclosure hereof recognizes that such is the nature of the art, and reiterates that FIG. 11 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 11 and refer to "computer" or "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. Memory 1112 may be removable, nonremovable, or a combination thereof. Exemplary memory includes solid-state memory, hard drives, optical-disc drives, etc. Computing device 1100 includes one or more processors 1114 that read data from various entities such as bus 1110, memory 1112 or I/O components 1120. One or more presentation components 1116 presents data indications to a person or other device. Exemplary one or more presentation components 1116 include a display device, speaker, printing component, vibrating component, etc. I/O ports 1118 allow computing device 1100 to be logically coupled to other devices including I/O components 1120, some of which may be built in computing device 1100. Illustrative I/O components 1120 include a microphone, camera, joystick, game pad, satellite dish, scanner, printer, wireless device, etc.

Radio 1124 represents a radio that facilitates communication with a wireless telecommunications network. In aspects, the radio 1124 utilizes one or more transmitters, receivers, and antennas to communicate with the wireless telecommunications network on a first downlink/uplink channel. Though only one radio is depicted in FIG. 11, it is expressly conceived that the computing device 1100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 1124 might additionally or alternatively facilitate other types of wireless communications including Wi-Fi, Bluetooth, ZigBee, WiMAX, LTE, and the like. As can be appreciated, in various embodiments, radio 1124 can be configured to support multiple technologies and/or multiple radios can be utilized to support multiple technologies. A wireless telecommunications network might include an array of devices, which are not shown so as to not obscure more relevant aspects of the disclosure. Components such as a base station, a communications tower, or even access points (as well as other components) can provide wireless connectivity in some embodiments.

The foregoing descriptions of the embodiments of the disclosure are illustrative, and modifications in configuration and implementation will occur to persons skilled in the art. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A method for facilitating exchanging a component of a mobile scanning device, the method comprising:
   detecting that a battery providing power to a mobile scanning device has a remaining charge equal to or below a charge threshold;
   scanning for at least one wireless communication signal;
   extracting a set of data from each of the at least one wireless communication signal detected during the scanning;
   based on the extracted at least one set of data,
      determining which of the at least one wireless communication signal corresponds to a replacement battery for the mobile scanning device, and
      broadcasting a wireless communication signal including data requesting reservation of the replacement battery;
   mapping a path from a current location of the mobile scanning device to a remote charging station associated with the reserved replacement battery;
   presenting, via a display integrated with the mobile scanning device, the path to the location associated with the reserved replacement battery;
   determining that the mobile scanning device is within a predetermined distance from the remote charging station based on a signal strength indicator computed from wireless communication signals broadcast by the remote charging station; and
   responsive to determining that the mobile scanning device is within a predetermined distance from the remote charging station, broadcasting another wireless communication signal that when received causes the remote charging station to deactivate a locking mechanism associated with the reserved replacement battery that in an active state prevents removal of the reserved replacement battery, the locking mechanism selected from the group consisting of mechanical mechanism, electromechanical mechanism, magnetic mechanism, or electromagnetic mechanism.

2. The method of claim 1, wherein the charge threshold is variable based on one or more of a temperature detected by a sensor of the mobile scanning device, a time of day, the current location of the mobile scanning device, or a rate of power consumption for the mobile scanning device.

3. The method of claim 1, further comprising:
establishing a bi-directional wireless communication connection with another mobile scanning device; and
requesting or receiving location data from the another mobile scanning device for a plurality of replacement batteries that are unreserved.

4. The method of claim 1, wherein the at least one wireless communication signals are broadcast by a charging device including at least one battery charging port.

5. The method of claim 1, wherein each of the at least one wireless communication signal comprises an advertising packet using Bluetooth or WiFi protocols.

6. The method of claim 5, wherein the advertising packet includes data identifying a model of the replacement battery.

7. The method of claim 1, wherein the method further comprises:
responsive to detecting that the mobile scanning device is within the predetermined distance from the remote charging station, triggering emission of an audio or visual signal by a charging unit associated with the reserved replacement battery.

8. The method of claim 1, further comprising:
receiving another wireless communication signal during the presenting of the path to the location associated with the reserved replacement battery, the other wireless communication signal including data indicating that the reserved replacement battery was removed from a charging unit;
presenting, via the display integrated with the mobile scanning device, another path to another replacement battery; and
defining the other replacement battery as the replacement battery.

9. The method of claim 1, wherein requesting reservation of the replacement battery includes the mobile scanning device broadcasting a signal to a remote charging station requesting that the replacement battery be reserved for mobile scanning device.

10. The method of claim 1, further comprising:
activating a locking mechanism to lock the reserved replacement battery within a charging port of a remote charging station at the location to prevent removal therefrom responsive to the reservation request being received; and
deactivating the locking mechanism to unlock the reserved replacement battery within the charging port of the remote charging station responsive to an authentication procedure being satisfied.

11. The method of claim 10, wherein the authentication procedure includes the remote charging station detecting the mobile device being within a predetermined range of the remote charging station and/or the remote charging station detecting a code entered by a user of the mobile scanning device.

12. The method of claim 1, further comprising releasing the reserved replacement battery by itself to be exchanged with the battery currently disposed within the mobile scanning device.

13. The method of claim 1, further comprising releasing the reserved replacement battery within another mobile scanning device to be exchanged together with the mobile scanning device and its current battery.

14. The method of claim 1, further comprising the mobile scanning device maintaining locally-stored records indicative of a last update of battery data for a plurality of batteries being charged at a remote location.

15. The method of claim 14, further comprising the mobile scanning device sharing the battery data to another mobile scanning device in a peer-to-peer network.

16. One or more non-transitory storage media storing, that when executed by at least one processor, cause the at least one processor to perform operations including:
detecting that a battery providing power to a mobile scanning device has a remaining charge equal to or below a charge threshold;
scanning for at least one wireless communication signal;
extracting a set of data from each of the at least one wireless communication signal detected during the scanning;
based on the extracted at least one set of data,
determining which of the at least one wireless communication signal corresponds to a replacement battery for the mobile scanning device, and
broadcasting a wireless communication signal including data requesting reservation of the replacement battery;
mapping a path from a current location of the mobile scanning device to a remote charging station associated with the reserved replacement battery;
presenting, via a display integrated with the mobile scanning device, the path to the location associated with the reserved replacement battery;
determining that the mobile scanning device is within a predetermined distance from the remote charging station based on a signal strength indicator computed from wireless communication signals broadcast by the remote charging station; and
responsive to determining that the mobile scanning device is within a predetermined distance from the remote charging station, broadcasting another wireless communication signal that when received causes the remote charging station to deactivate a locking mechanism associated with the reserved replacement battery that in an active state prevents removal of the reserved replacement battery, the locking mechanism selected from the group consisting of mechanical mechanism, electromechanical mechanism, magnetic mechanism, or electromagnetic mechanism.

17. The storage media of claim 16, where the operations further include, communicating the path to the mobile scanning device for presentation.

18. The storage media of claim 16, further comprising:
establishing a bi-directional wireless communication connection with another mobile scanning device; and
requesting location data from the another mobile scanning device for a plurality of replacement batteries that are unreserved and docked at a remote location.

19. The storage media of claim 16, wherein responsive to detecting that the mobile scanning device is within the predetermined distance from the remote charging station, triggering emission of an audio or visual signal by a charging unit associated with the reserved replacement battery.

20. The storage media of claim 16, wherein responsive to detecting that the mobile scanning device is within the predetermined distance from the remote charging station, activating a haptic sensor integrated with the mobile scanning device.

* * * * *